Patented Apr. 14, 1931

1,800,574

UNITED STATES PATENT OFFICE

ALFRED THAUSS, OF COLOGNE-DEUTZ, AND ADOLF DAHL, OF WIESDORF-ON-THE-RHINE, GERMANY, ASSIGNORS TO GENERAL ANILINE WORKS, INC., OF NEW YORK, N. Y., A CORPORATION OF DELAWARE

STUFFING OF LEATHER

No Drawing. Application filed December 23, 1927, Serial No. 242,285, and in Germany December 28, 1926.

The present invention concerns the stuffing of leather and the products obtainable thereby, and consists in the employment of the fatty acids derived from wool fat either before or after the dyeing of the leather; the said fatty acids are incorporated into the leather either as such or in the form of their aqueous solutions in the stuffing drum or by rubbing in on the table before or after the dyeing.

In order to stuff chrome-tanned and vegetable leather, as well as leather tanned in any other way fat liquors are employed, which are either incorporated into the leather by stuffing or else rubbed in. Such fat liquors consist of an aqueous emulsion of vegetable, animal or mineral fats and oils, products either soluble or insoluble in water being employed in order to obtain the desired result. The emulsification of the materials for stuffing the leather is effected with the aid of soap or weak alkalies.

The emulsions of fat liquors above indicated, which are in general use, involve various disadvantages in their application, which may be shortly described:—

The liquors are sensitive to acids, that is to say, in the presence of inorganic or organic acids they lose their uniformity, separating fat or oily particles, which are dispersed unevenly over the leather and consequently cause the formation of spots in the currying of the leather. These phenomena become especially noticeable and unpleasant in the case of chrome-tanned upper leathers, semi-chrome leathers and chrome splits.

A further disadvantage of the fat liquors consists in that in those cases, in which for certain technical reasons leather is stuffed previous to dyeing, an uneven absorption of the dyestuffs has to be contemplated. This is especially disturbing, when the grain of the leather to be stuffed has only taken up the liquor to an incomplete extent, which in the manufacture of patent leather entails a tedious degreasing process.

Finally reference may be made to the fact that in the so-called two-bath dyeing process, which consists in subjecting chrome-tanned leather to a preliminary acid and substantive dyeing and then subjecting the same to a basic topping in a fresh bath, the fat liquor which exerts a faintly alkaline reaction causes the basic dyestuff to strip.

In accordance with the present invention all the difficulties described above can be avoided by replacing the fat liquor hitherto used by sulfonated fatty acids derived from wool fat, such as are obtainable by sulfonating, in the presence of a phenol, the mixture of fatty acids occurring in wool-fat, for example, by means of sulfuric acid monohydrate or chloro-sulfonic acid at normal or slightly elevated temperatures.

The advantages resulting from the application of these sulfonated fatty acids derived from wool fat consist in that they dissolve in water, no matter whether the water contains acid or alkaline constituents or whether it has a neutral reaction. In particular the non-sensitiveness to acid renders it possible to combine the hitherto tedious dyeing and stuffing operations into one single operation, which is equivalent to a less expensive manufacture of leather and a more efficient utilization of the plant.

A further advantage accompanying the application of the sulfonated fatty acids derived from wool fat consists in the fact that they are quickly and evenly absorbed and fixed in the leather. The troublesome exudation of fat from the leather (an ever recurring phenomenon) can thus be avoided with certainty.

The stuffing effect is of an outstanding order and exhibits in contradistinction with the stuffing hitherto customary the great advantage that the feel of the leather remains dry and smooth without in any way prejudicing the softness and suppleness of the leather.

The following examples will illustrate our invention:

*Example 1.*—In order to stuff normal, previously dyed, chrome-tanned, upper leather, 4 kg. of a fatty acid derived from the wool fat, obtainable as above indicated are dissolved in 50 liters of water at a temperature from about 40 to 50° C. and this solution is introduced into the rotating stuffing drum through the hollow axle. After about 15 minutes the fatty acid employed is completely absorbed and fixed by the leather. The quantities referred to are used in conjunction with 100 kg. by weight of shaved leather. After the absorption of the fat the leather is dried and curried in the customary manner.

Example 2.—A solution of 4 kg. of the sulfonated fatty acid derived from wool fat, described above, in 50 kg. of water at a temperature from about 40 to 50° C. is added to the stuffing drum in which 100 kg. by weight of shaved, chrome-tanned leather and 150 liters of water at a temperature from about 40 to 50° C. have previously been placed. The stuffing is completed after about 15 minutes, after which the leather can be dyed in the same bath. When the dyeing is completed the leather is dried and curried in the normal manner.

Example 3.—A solution of the sulfonated fatty acids derived from wool fat described above in 50 liters of water at a temperature from about 30 to 35° C. is rubbed on the table into the leather which is to be stuffed, either on the grain side or on the flesh side.

We claim:

1. The process which comprises stuffing leather with a product obtained by sulfonating the mixture of fatty acids occurring in wool-fat in the presence of a phenol.

2. The process which comprises stuffing leather with an aqueous solution of a product obtained by sulfonating the mixture of fatty acids occurring in wool-fat in the presence of a phenol.

3. The process which comprises stuffing dyed leather with a product obtained by sulfonating the mixture of fatty acids occurring in wool-fat in the presence of a phenol.

4. The process which comprises stuffing dyed leather with an aqueous solution of a product obtained by sulfonating the mixture of fatty acids occurring in wool-fat in the presence of a phenol.

5. As a new product of manufacture, leather having been stuffed with a product obtained by sulfonating the mixture of fatty acids occurring in wool-fat in the presence of a phenol.

6. As a new product of manufacture, dyed leather having been stuffed after the dyeing with a product obtained by sulfonating the mixture of fatty acids occurring in wool-fat in the presence of a phenol.

In testimony whereof, we have hereunto set our hands.

ALFRED THAUSS.
ADOLF DAHL.